United States Patent [19]

Nabors et al.

[11] Patent Number: 5,027,360
[45] Date of Patent: Jun. 25, 1991

[54] HIGH POWER CONTINUOUS WAVE INJECTION-LOCKED SOLID STATE LASER

[75] Inventors: C. David Nabors, Bedford, Mass.; Robert L. Byer, Stanford, Calif.

[73] Assignee: Stanford University, Standford, Calif.

[21] Appl. No.: 538,097

[22] Filed: Jun. 13, 1990

[51] Int. Cl.$^5$ ............... H01S 3/098; H01S 3/139
[52] U.S. Cl. ....................... 372/18; 372/26; 372/29; 372/32; 372/94; 372/97
[58] Field of Search ............ 372/18, 20, 26, 29, 372/32, 68, 93, 94; 330/4.3

[56] References Cited

U.S. PATENT DOCUMENTS

| 3,646,468 | 2/1972 | Buczek et al. | 351/94.5 |
| 3,646,469 | 2/1972 | Buczek et al. | 331/94.5 |
| 3,740,664 | 6/1973 | Freiberg et al. | 331/94.5 |
| 4,755,016 | 7/1988 | DeLoach Jr. et al. | 350/96.16 |
| 4,907,234 | 3/1990 | Goldberg et al. | 372/18 |
| 4,930,133 | 5/1990 | Babbitt et al. | 372/32 |

OTHER PUBLICATIONS

"Coherent Summation of Injection-Locked, Diode-Pumped Nd:YAG Ring Lasers", Harrison, et al., Optics Letters, vol. 13, No. 2, pp. 111-113, Feb. 1988.
"Injection Locking and Chaining of Diode-Pumped Monolithic Lasers", Emily A. Cheng, Poster Paper Presented at Annual Meeting of Optical Society of America, Santa Clara, Calif., Oct. 1988.
"Laser Phase and Frequency Stabilization using an Optical Resonator", Drever, et al., Applied Physics B 31, 97-105 (1983).
"Injection Locking of Argon-Ion Lasers", C. N. Man and A. Brillet, Optics Letters, vol. 9, No. 8, pp. 333-335, Aug. 1984.

Primary Examiner—Frank Gonzalez
Assistant Examiner—Galen J. Hansen
Attorney, Agent, or Firm—Limbach, Limbach & Sutton

[57] ABSTRACT

A high power injection-locked laser system (10) is disclosed which includes master and slave lasers (12, 14) both of which are solid state lasers having continuous wave outputs. The slave laser has an output power at least ten times greater than the master laser. In the preferred embodiment, the slave laser is at least one-hundred times as powerful as the master laser. In accordance with the subject invention, a servo-loop control system is used to maintain the injection locked condition. A discriminant signal is generated that is indicative of drift in the slave laser cavity. The discriminant signal is used adjust the length of the slave laser cavity to maintain the locked condition.

13 Claims, 3 Drawing Sheets

HIGH POWER CONTINUOUS WAVE INJECTION-LOCKED SOLID STATE LASER

GOVERNMENT CONTRACT

The present invention was supported by the U.S. Office of Naval Research under contract N00014-88-K-0710 and the government has certain rights therein.

TECHNICAL FIELD

The subject invention relates to injection locked laser systems. More particularly, a solid state CW injection locked system is disclosed with a high power ratio and a very stable frequency output.

BACKGROUND

Injection locking techniques have been used in a number of laser systems. This technique is of particular interest when a low power laser with desirable frequency properties (the master) is used to impose its frequency and mode structure onto a higher power laser (the slave) whose spectral properties would otherwise not be as good.

This latter result is achieved by injecting the output of the master laser into the cavity of the slave laser. As the frequency of the master laser approaches one of the axial mode frequencies of the slave laser, light from the master laser is regeneratively amplified to higher intensities, eventually saturating the gain in the slave laser to such an extent that the original free-running mode of the slave laser is extinguished. Within this locking-range, the output of the slave laser is frequency locked to the output frequency of the master laser. Injection locking offers the advantage of single-frequency operation of a high power laser without the use of etalons or other intracavity elements that reduce the efficiency and output power of the laser.

The term injection locking is most often used to refer to systems wherein a the output from a CW master laser is injected into a CW slave laser. This should be contrasted to the situation where the output of a CW master laser is injected into a pulsed slave laser which is more appropriately and often called injection seeding. Injection seeding is theoretically less stringent since it is easier to force a mode of operation on an intermittent slave. The requirements for imposing a given frequency and mode structure onto a circulating beam of energy in a CW slave laser are much greater.

Injection locking techniques have been successfully used with ion lasers, dye lasers and diode lasers. Efforts to extend this approach to solid state lasers have principally been limited to systems where the master and slave laser operate at roughly the same power level. The resulting output is a summation of the two output powers. This approach is often referred to as coherent summation or chaining. These prior art systems are very sensitive and not particularly stable. More importantly, the output of the slave laser was of the same order of magnitude as the master laser. Therefore, it would be desirable to provide an injection locking system for solid state lasers which is highly stable and can be used to generate high powers.

Accordingly, it is an object of the subject invention to provide a new and improved solid state injection locked laser system.

It is a further object of the subject invention to provide an injection locked laser system for continuous wave lasers.

It is another object of the subject invention to provide an injection locked laser system for a high power solid state slave laser.

It is still a further object of the subject invention to provide a laser system where a master laser is used to injection lock a solid state ring laser.

It is still another object of the subject invention to provide an injection locked laser system wherein the output power of the slave laser is at least one order of magnitude higher than the output power of the master laser.

It is still a further object of the subject invention to provide an actively stabilized injection locked laser system.

SUMMARY OF THE INVENTION

In accordance with these and other objects, the subject invention includes a solid state master laser having a continuous wave, stable, single frequency output. In the illustrated embodiment, the master laser is defined by a diode pumped, non-planar monolithic ring having an output power of about 30 to 40 milliwatts.

The CW output of the master laser is injected in a CW solid state slave laser. In the illustrated embodiment, the slave laser is lamp-pumped ring laser.

In accordance with the subject invention, a stable, single frequency output is maintained using an active servo technique. The preferred servo technique is derived from the Pound approach used in microwave systems and suggested for laser use by Drever et. al. in "Laser Phase and Frequency Stabilization Using an Optical Resonator," *Applied Physics*, B 31, 97 (1983). In this approach, a phase modulator is used to impose FM sidebands onto the injected light from the master laser. A small portion of the output of the slave laser is monitored by a phase sensitive homodyne receiver also connected to the modulation source. The receiver generates a discriminant signal that is used to actively adjust the length of the resonator of the slave laser to maintain the injection locking condition.

A laser system formed in accordance with this invention generated a stable single frequency output from the slave laser of 13 Watts which corresponds to a 400:1 slave/master power ratio. In addition, the injection locking forced the ring to operate in a unidirectional manner without additional cavity components thereby maximizing useable output in a simple fashion. A laser formed in accordance with the subject invention would be suitable for use in high efficiency nonlinear optics, optical radar, and interferometric gravity wave detection.

Further objects and advantages of the subject invention will become apparent based on the following detailed description taken in conjunction with the drawings in which:

DETAILED DESCRIPTION OF THE PREFERRED EMBODIMENT

Figure 1:
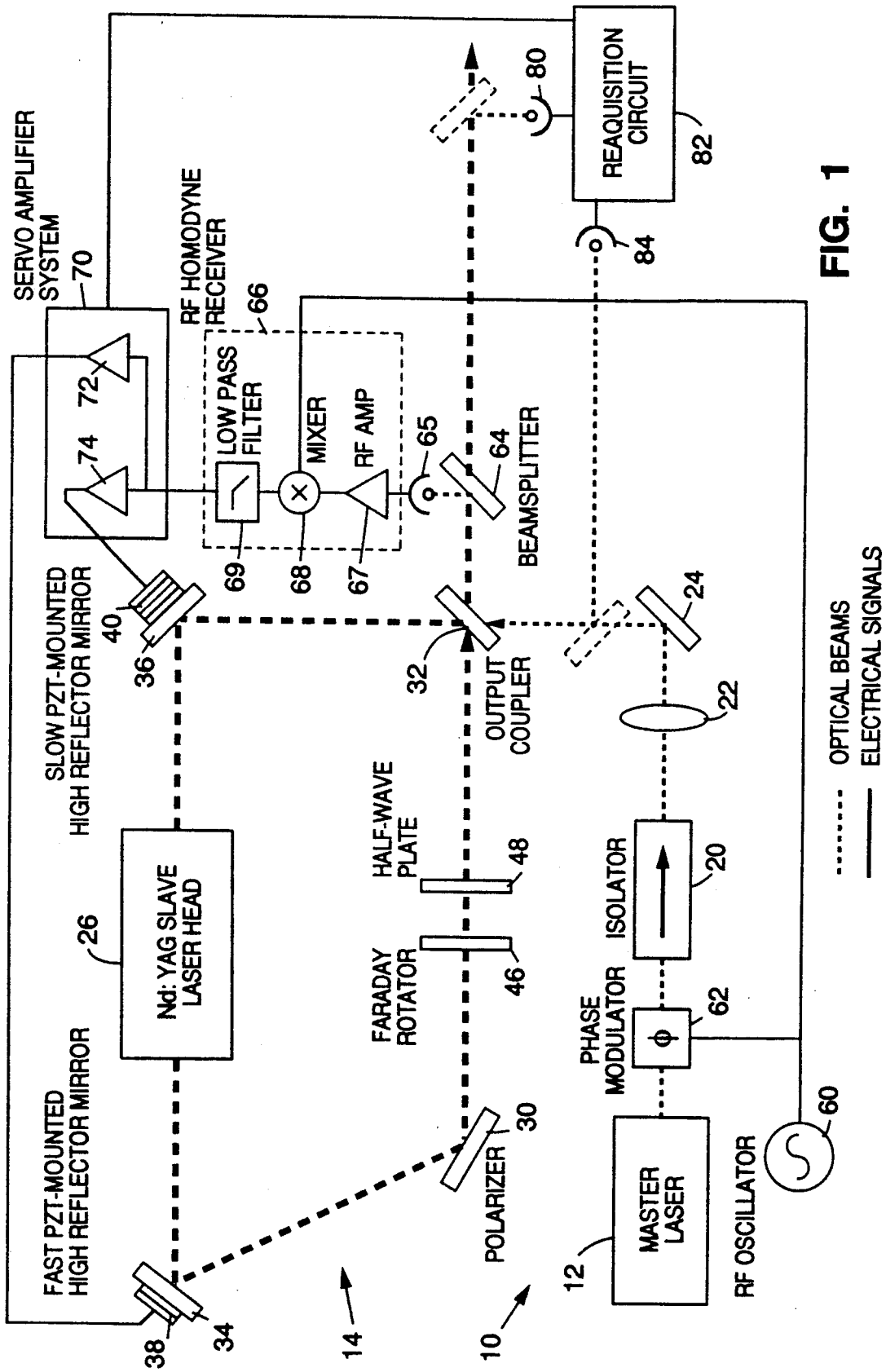
FIG. 1 is a schematic diagram of an injection locked laser system formed in accordance with the subject invention.

Turning to FIG. 1, there is illustrated a schematic diagram of an injection locked laser system 10 formed in accordance with the subject invention. In this laser system, the output from a master laser 12 is injected into the cavity of a slave laser 14.

The master laser 12 is a solid state, CW laser, having a very stable, single frequency output. In the preferred embodiment, master laser 12 is defined by a monolithic, single-mode, nonplanar ring oscillator pumped with a laser diode. A suitable laser is manufactured by Lightwave, Inc. Model No. 120. Another suitable master lasers are available from ET, Inc. The power generated by the master laser 12 and incident on the slave laser 14 is up to 40 mW in a single axial mode. The frequency stability of the master oscillator is excellent, with typically less that 20 KHz of linewidth, and the potential for stabilization to the sub-kilohertz level. In order to stabilize the frequency of the laser, the temperature of the monolithic laser crystal is maintained at approximately 38° C.

The output of the master 12 is directed through an isolator 20. Isolator 20 is provided to prevent any light generated by the slave laser 14 from entering the cavity of the master laser. Feedback of the slave laser light into the master laser could adversely effect the stability of the master laser. In addition, if the slave laser is operated without an optical diode, higher power feedback could damage the master laser. The output of the master laser is mode matched to the slave cavity by lens 22. The output master laser is directed into the slave laser cavity by mirror 24.

The slave laser 14 can have a linear cavity. In the preferred embodiment, the slave laser 14 is configured as a ring. The gain medium 26 of the ring is defined by a solid state Nd:YAG rod with a lamp assembly. A suitable assembly is available from Coherent, Inc., Model 76-s Atares TM laser. The twinlamp head consumes 9 kW of electrical power and is temperature stabilized at 36° C. by a primary-secondary water cooling system.

The ring laser cavity is defined by four flat optical elements. The optical elements include thin film Brewster polarizer 30, an output coupler 32 and two high reflectors 34 and 36. The cavity length is 133 cm which corresponds to a free spectral range of 225 MHz. The high reflectors 34 and 36 are mounted on PZT transducers 38 and 40 for adjusting the length of the cavity. The length of the cavity is actively adjusted in the stabilization scheme of the subject invention discussed in greater detail below. Transverse mode stability is provided by the thermal focussing of the Nd:YAG rod, such that the laser ran in TEM$_{00}$ mode without an aperture. In The experimental laser system, the output coupler had $T_s=17\%$, $T_p=45\%$, which was undercoupled for this system.

In the illustrated embodiment, a means for forcing unidirectional operation of the ring (in the form of an optical diode) is included. It has been found that the ring will operate in a unidirectional manner without the optical diode. However, it is believed that an optical diode is desirable in a commercial device to insure that no light is generated in the counterpropagating direction.

The optical diode includes an FR-5 glass Faraday rotator 46 (manufactured by Hoya Corp) and a half-wave plate 48. The rotator 46 and half-wave plate 48, in combination with the polarizer 30 enforce unidirectional operation of the ring. As much as 12 W can be obtained in a single direction, with output power controlled by rotating the half-wave plate 48. Below 4 Watts, the laser system operates in a single axial mode. The Faraday rotator can be replaced with a terbium gallium garnet (TGG) crystal rotator for enhanced rotation and reduced insertion loss.

As long as the cavity of the slave laser is closely in resonance with the output frequency of the master laser, the lasers will remain locked and the output frequency of the slave laser will remain the same as the output frequency of the master laser. In practice, it is very difficult to maintain the locked condition due to environmental changes and other perturbations which effect the length of slave laser cavity.

In accordance with the subject invention, this problem is overcome by providing a servo loop stabilization system. There are a number of stabilization systems which have been utilized in prior art laser systems. One stabilization system was initially developed for stabilizing lasers to passive cavities as reported in T. W. Hanch and B. Couillaud, *Optics Communications*, Vol. 35, page 441 (1980). This technique was extended for used in laser injection locking as described in B. Couillaud et al., *Optics Letters*, Vol. 9, page 435 (1984).

In the preferred embodiment, the Pound Drever FM sideband technique is used. The approach is described in "Laser Phase and Frequency Stabilization Using an Optical Resonator," cited above. In this approach FM sidebands are imposed on the injected light from the master laser. As shown in FIG. 1, the output from an RF oscillator 60 is supplied to LiNbO$_3$ phase modulator 62. The modulation frequency used was 40 MHz which was chosen to be greater than the width of the slave laser cavity resonance.

A small portion of the output light from the slave laser 14 is picked-off by a beam splitter 64 and measured by a photodetector 65. When the output frequency of the master laser is exactly in resonance with the slave laser cavity, neither the carrier (which alone resonates with the slave laser cavity and is amplified) nor the sidebands will be phase shifted. However, if the slave laser cavity drifts (but not so much as to drift completely out of the injection locking band defined below), the carrier will be phase shifted with respect to the sidebands, which are not affected. This phase shift can be detected as a modulation in the amplitude of the output of the slave laser which is at the frequency of the RF oscillator. Accordingly, an RF homodyne receiver 66 (consisting of an RF amplifier 67, mixer 68 and a low pass filter 69) can be used to generate a discriminant signal indicative of the phase relationship between the RF oscillator and the amplitude modulation of the output beam of the slave laser which is also proportional to the detuning of the slave laser cavity resonance to the master laser optical frequency. This discriminant signal is then used in a servo loop to adjust the cavity length of the slave laser to maintain the locked condition.

The discriminant signal is sent to a servo amplifier 70 which consists of two cascaded integrator type amplifiers 72 and 74 for slow and fast loop output. The fast loop is AC coupled to avoid dynamic range problems with the high bandwidth PZT. The slow PZT 40 is used to correct for large, slowly varying excursions while fast PZT 38 is used to correct for small, fast excursions. The arrangement provides a net gain of 56 dB and DC and unity-gain bandwidth of $\approx 30$ kHz.

Figure 2:
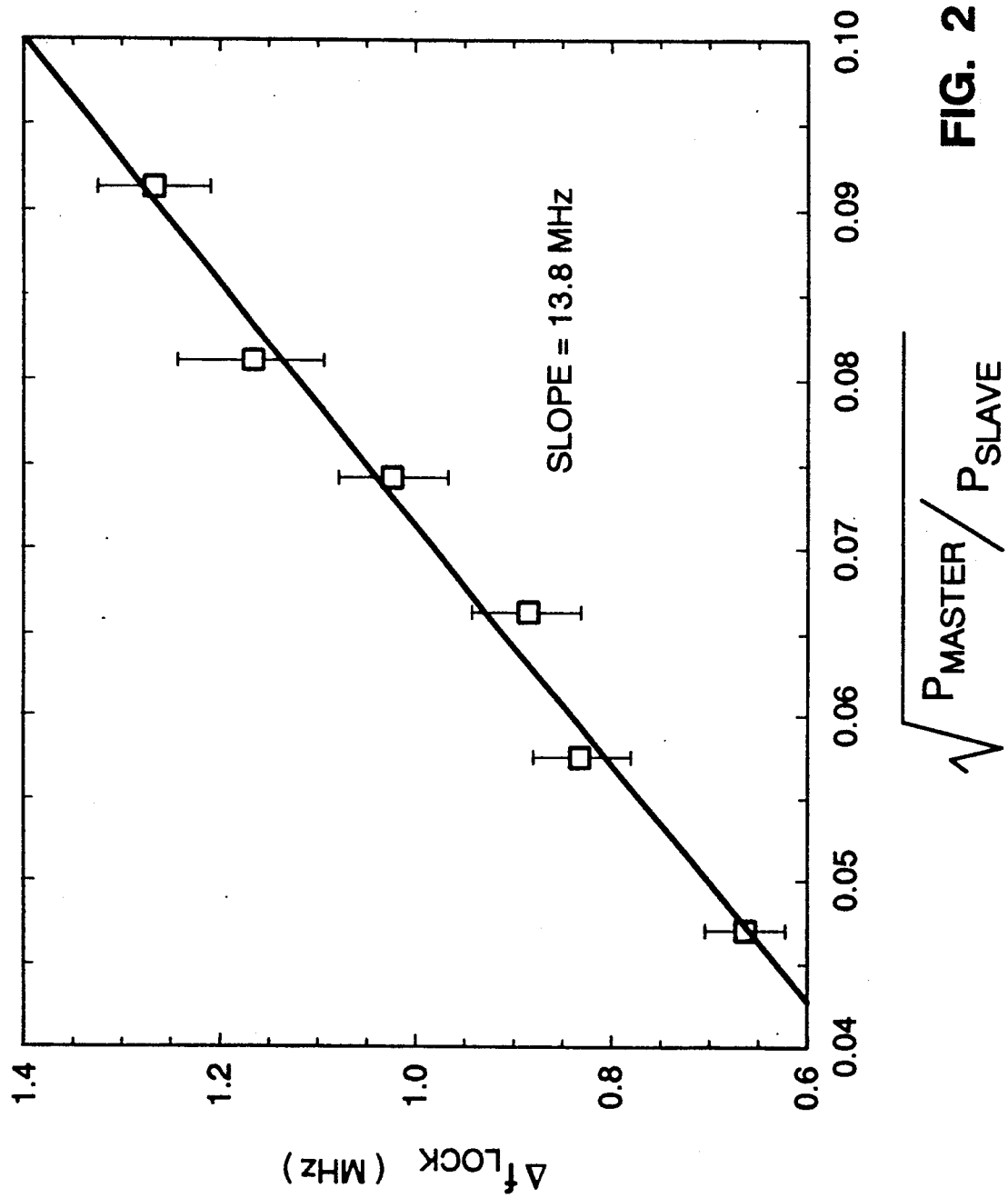
FIG. 2 is a graph illustrating the relationship between locking range and the root power ratio when the slave laser was operated with a four watt output.

The full width of the locking range is given by $$\Delta f_{lock} = \eta \frac{T \times FSR}{\pi} \sqrt{\frac{P_{master}}{P_{slave}}} \quad (1)$$

where T is the transmittance of the slave's output coupler, FSR is the slave's free spectral range, and $\eta$ is an efficiency factor for the overlap of the lasers' spatial and polarization modes. The locking range was measured by scanning the slave cavity length and measuring the width of the frequency discriminant from the maximum to minimum of the dispersive-shaped signal. FIG. 2 shows locking bandwidth as a function of root power ratio at a slave power of 4 Watts. The slope of the line is 13.8 MHz, and shows reasonable agreement with the calculated value of 16.8 MHz based on $\eta = 1$ and an effective output coupling of 23%, due to the tilting of the polarization of the slave's circulating field by the half-wave plate in its cavity. The discrepancy can be accounted for by imperfect spatial and polarization mode-matching.

Injection locking with slave powers up to 10 Watts was achieved using the optical diode for unidirectional operation and fast-loop servo control, and up to 5 Watts using the slow loop only. Total master oscillator power was typically 30-40 mW, with 80% of the power in the carrier. The injection locking process could be observed with a scanning confocal interferometer (not shown). Both the master and slave frequencies were distinct when the servo loop was open, and all of the optical power was observed at the master laser frequency in closedloop operation.

As noted above, unidirectional operation can be achieved without an optical diode. This was demonstrated by removing the Faraday rotator 46 from the cavity and initially operating the slave laser without injection locking. In this case, the free running slave laser oscillated in both directions with roughly equal powers, and in about ten axial modes. (In this experiment, the half-wave plate 48 was retained to control the slave output power by changing the cavity polarization state.) When the free running slave laser was then injection locked with the master laser, the power in the injected direction was roughly doubled, while the power in the opposite direction was completely suppressed. As much as 13 Watts of injection-locked power (measured before the beam splitter 64) was produced by the slave. The total master power incident on the slave could be as little as 30 mW, for a slave:master power ratio of 400:1.

Figure 3:
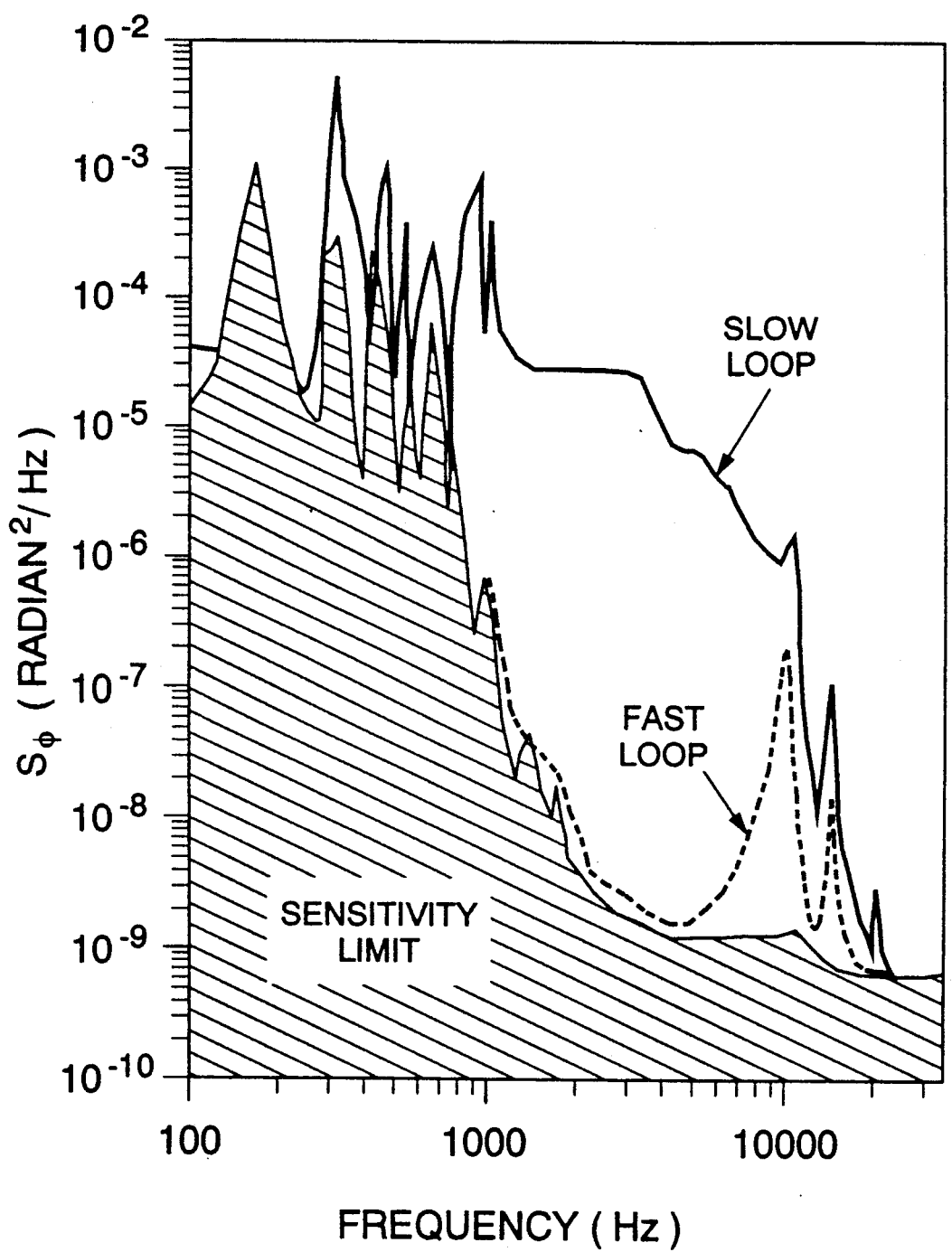
FIG. 3 is a graph illustrating the phase fidelity of the injection locked system of the subject invention for fast and slow servo loop operation.

To determine the phase fidelity of the injection-locked system, a portion of the master laser light was picked off before the isolator 20, frequency shifted with an acousto-optic (AO) modulator, and then heterodyned on a photodiode against the injection-locked slave laser. The RF noise spectrum can be converted into total phase noise spectral density $S_\phi(f)$ using the formula $$S_\phi(f) = \frac{2P_{ssb}(f)}{B P_c} \left[ \frac{radian^2}{Hz} \right] \quad (2)$$

where $P_{ssb}(f)$ is the single sideband power density, $P_c$ is the carrier power, and B is the resolution bandwidth. This all-optical measurement yields an upper bound for $S_\phi(f)$ (as limited by the sensitivity), as compared to techniques relying on measures of the closed-loop error signal which yield lower bounds. FIG. 3 shows $S_\phi(f)$ (corrected for spectrum analyzer equivalent-noise amplitude and bandwidth characteristics) plotted for fast and slow servo loop operation along with the sensitivity limit of the measurement (shaded region) as determined by sending a reference beam through the system and beating it against itself. At low frequencies the sensitivity is severely compromised by acoustic noise on the optical table, with significant contributions from the lamp-pumped slave's water cooling system.

Total rms phase noise is calculated from $$\Delta\phi^2_{rms} \int_{ssb} df S_\phi(f) \quad (3)$$

where $S_{100}(f)$ is integrated over a single sideband frequency range. For slow loop servo operation $S_\phi(f)$ may be integrated in the bandwidth shown to yield $\Delta\phi_{rms} \approx 0.3$ radian of phase noise on the injection locked slave as compared to the master. For fast loop operation $\Delta\phi_{rms}$ is dominated by the sensitivity limit, and no reliable result can be extracted. The integrated phase noise corresponds to an upper limit of less than 1 kHz of additional linewidth contribution. This linewidth, when convolved with the master's free running linewidth, yields the width of the injection-locked output. For example, the linewidth of a slave laser locked to a master oscillator with 10 kHz linewidth would be broadened to 10.05 kHz for Gaussian lineshapes.

Various modifications should be considered within the scope of the subject invention. For example, the laser system can be based on other solid state materials such as Nd:glass, Nd:YLF, Nd:YALO and Ho:YAG operating at various wavelengths. It may also be possible to inject a slave laser based on one material with a master laser based on another material.

The master laser need not be of the nonplanar ring oscillator type discussed above. Other types of single frequency lasers may be used such as the PRO planar ring oscillator manufactured by ET. Inc or a single-frequency strained-laser InGaAS laser diode which are now becoming available. The slave laser need not be a ring. In addition, efficiency and free running performance of the subject invention might be improved through the use a diode-laser pumped solidstate slave laser.

While a laser system of the type described above is relatively stable, significant environmental perturbations (such as a transient mechanical vibration) may be severe enough to kick the slave laser frequency out of injection locking and even out of the acquisition bandwidth for the Pound-Drever locking system. Once outside of this acquisition band, the Pound-Drever servo system actually inhibits the reacquisition of the injection locking condition. In this case, some form of human intervention would be necessary to reacquire the lock.

The subject system can therefore be further enhanced if a means is provided which can detect the loss of the locking condition and take steps to reacquire it. When the slave laser is not locked, it will generally run in many frequencies, separated by it cavity mode spacing of c/L (known as the free spectral range or FSR), typically 10 to 100 MHz. A photodetector 80 (shown in FIG. 1) can be used to detect the presence of multimode operation by measuring photocurrent fluctuations at that frequency. A discriminator can be constructed with the photodetector 80 and simple electronic reacquisition circuit 82 that can generate a logical true when there is no signal present at the FSR frequency, implying that the slave laser is locked, or a false when an RF signal is present. The technique may be used for slave lasers in either the ring or standing-wave configuration.

An alternative approach to detecting the loss of lock is suited for slave lasers having a ring geometry wherein injection locking (rather than an optical diode) is used to enforce unidirectional operation of the ring. In this case, the loss of lock will cause roughly half of the free-running slave laser power to be sent in the counterpropagating direction. A photodetector 84 can be used to measure this counterpropagating power and generate the appropriate logical signal.

Once the loss of lock has been detected by either approach, a transient voltage could be added to the slave cavity length adjustment mechanism (possibly through the Pound-Drever servo amplifier) to kick the system back into the Pound-Drever acquisition band. This reacquisition circuit 82 would then disable itself for some number of milliseconds to allow the injection locking to the reestablished by the Pound-Drever servo.

In summary, there has been disclosed a high power injection-locked laser system. The laser system includes master and slave lasers both of which are solid state lasers having continuous wave outputs. The slave laser has an output power at least ten times greater than the master laser. In the preferred embodiment, the slave laser is at least one-hundred times as powerful as the master laser. In accordance with the subject invention, a servoloop control system is used to maintain the injection locked condition. A discriminant signal is generated that is indicative of drift in the slave laser cavity. The discriminant signal is used adjust the length of the slave laser cavity to maintain the locked condition.

While the subject invention has been described with reference to a preferred embodiment, various other changes and modifications could be made therein, by one skilled in the art, without varying from the scope and spirit of the subject invention as defined by the appended claims.

We claim:

1. An injection locked laser system comprising:
   a master laser, said master laser including a solid state gain medium and having a continuous wave, single frequency output;
   a slave laser including a solid state gain medium located in a resonant cavity and having a continuous wave output at a power at least ten times greater than said master laser, with the output of said master laser being injected into said slave laser in order to cause said slave laser to oscillate at the same frequency as the output of the master laser; and
   means for actively stabilizing the slave laser so that its output frequency remains locked with the output frequency of the master laser.

2. A laser as recited in claim 1 wherein said active stabilization means includes a detector means for measuring an output parameter of the slave laser that is indicative of drift and a means for correcting any such drift.

3. A laser as recited in claim 2 wherein said means for correcting said drift includes a means for adjusting the length of the cavity of the slave laser.

4. A laser as recited in claim 1 wherein said stabilizing means comprises:
   means for frequency modulating the output from the master laser before said output is injected into the slave laser;
   means for detecting amplitude modulations in the output of the slave laser at the modulation frequency of the master laser output; and
   means for adjusting the length of the cavity of the slave laser based upon the phase difference between the modulation of the output of the master laser and the detected modulation in the output of the slave laser.

5. A laser as recited in claim 4 wherein said means for adjusting the length of the cavity of the slave laser includes a PZT transducer mounted to a mirror of the cavity of the slave laser.

6. A laser as recited in claim 1 further including a means for detecting when the output frequency of the slave laser is not the same as the output frequency of the master laser and disabling said stabilization means so that the output frequency of the master laser can be reacquired by the slave laser.

7. A laser as recited in claim 6 wherein said slave laser is a ring and wherein said means for detecting when the output frequency of the slave laser is not the same as the output frequency of the master laser includes a means for detecting the presence of counterpropagating light energy.

8. A laser as recited in claim 1 wherein said master laser is a diode-pumped, non-planar ring laser.

9. A laser as recited in claim 1 wherein said slave laser is a ring laser in which unidirectional operation is achieved due to the injection locking configuration.

10. A method of injection locking a slave laser to a master laser, wherein said master laser includes a solid state gain medium and has a continuous wave, single frequency output and wherein said slave laser includes a solid state gain medium located in a resonant cavity and having a continuous wave output at a power at least ten times greater than said master laser, said method comprising the steps of:
   injecting the output of said master laser into said slave laser in order to cause said slave laser to oscillate at the same frequency as the output of the master laser; and
   actively stabilizing the slave laser so that its output frequency remains locked with the output frequency of the master laser.

11. A method as recited in claim 10 further including the steps of:
   measuring an output parameter of the slave laser that is indicative of drift; and
   adjusting the length of the cavity of the slave laser to compensate for said drift.

12. A method as recited in claim 10 further including the steps of:
   frequency modulating the output the master laser before said output is injected into the slave laser;
   detecting amplitude modulations in the output of the slave laser at the modulation frequency of the master laser output; and adjusting the length of the cavity of the slave laser based upon the phase difference between the modulation of the output of the master laser and the detected modulation in the output of the slave laser.

13. A method as recited in claim 10 further including the steps of;

detecting when the output frequency of the slave laser is not the same as the output frequency of the master laser; and temporarily disabling said active stabilization step so that the output frequency of the master laser can be reacquired by the slave laser.

* * * * *

UNITED STATES PATENT AND TRADEMARK OFFICE
CERTIFICATE OF CORRECTION

PATENT NO. : 5,027,360

DATED : June 25, 1991

INVENTOR(S) : C. David Nabors and Robert L. Byer

It is certified that error appears in the above - identified patent and that said Letters Patent is hereby corrected as shown below:

In Col. 3, line 17, change "Another" to --Other--

In Col. 6, line 23, after "rms" add --=--;

In Col. 6, line 25, change "$S_{100}(f)$" to --$S_\phi(f)$--.

Signed and Sealed this

Second Day of February, 1993

Attest:

STEPHEN G. KUNIN

*Attesting Officer*      *Acting Commissioner of Patents and Trademarks*